United States Patent [19]

Grün

[11] 4,352,718

[45] Oct. 5, 1982

[54] METHOD FOR TREATING PARTICULATE MATERIAL

[75] Inventor: Gustav Grün, Ortenberg-Lissberg, Fed. Rep. of Germany

[73] Assignee: Claudius Peters AG, Fed. Rep. of Germany

[21] Appl. No.: 237,371

[22] Filed: Feb. 23, 1981

[30] Foreign Application Priority Data

Feb. 23, 1980 [DE] Fed. Rep. of Germany ....... 3006861

[51] Int. Cl.³ ............ B01D 1/18

[52] U.S. Cl. ............ 159/48 R; 159/DIG. 3; 159/4 R; 55/233; 23/313 R; 23/313 FB

[58] Field of Search ............ 159/DIG. 3, 47, 48 R, 159/4 R; 55/233, 257 R; 23/313 R, 313 FB

[56] References Cited

U.S. PATENT DOCUMENTS

| | | | |
|---|---|---|---|
| 3,444,668 | 5/1969 | Masuda | 55/257 R |
| 3,648,440 | 3/1972 | Egan | 55/257 R |
| 3,675,393 | 7/1972 | Meade | 55/233 |
| 3,676,064 | 7/1972 | Shick | 159/DIG. 3 |
| 3,793,809 | 2/1974 | Tomany et al. | 55/233 |

*Primary Examiner*—Norman Yudkoff
*Attorney, Agent, or Firm*—Eric P. Schellin

[57] ABSTRACT

There is disclosed a method and apparatus for treating particulate material. The said material is injected into a chamber. The material subsequently thereto is sprayed with a moistening material. At the same time gases are introduced at the top of the chamber and at the bottom thereof whereby the moisture on the particulate material is evaporated at a controlled rate. The parameters are such that the applied moisture has an opportunity to penetrate the particulate material for a short period of time to achieve some agglomeration before the moisture is evaporated. A fluidized bed is maintained at the bottom of the chamber and the treated particulate material is removed in this fashion.

5 Claims, 1 Drawing Figure

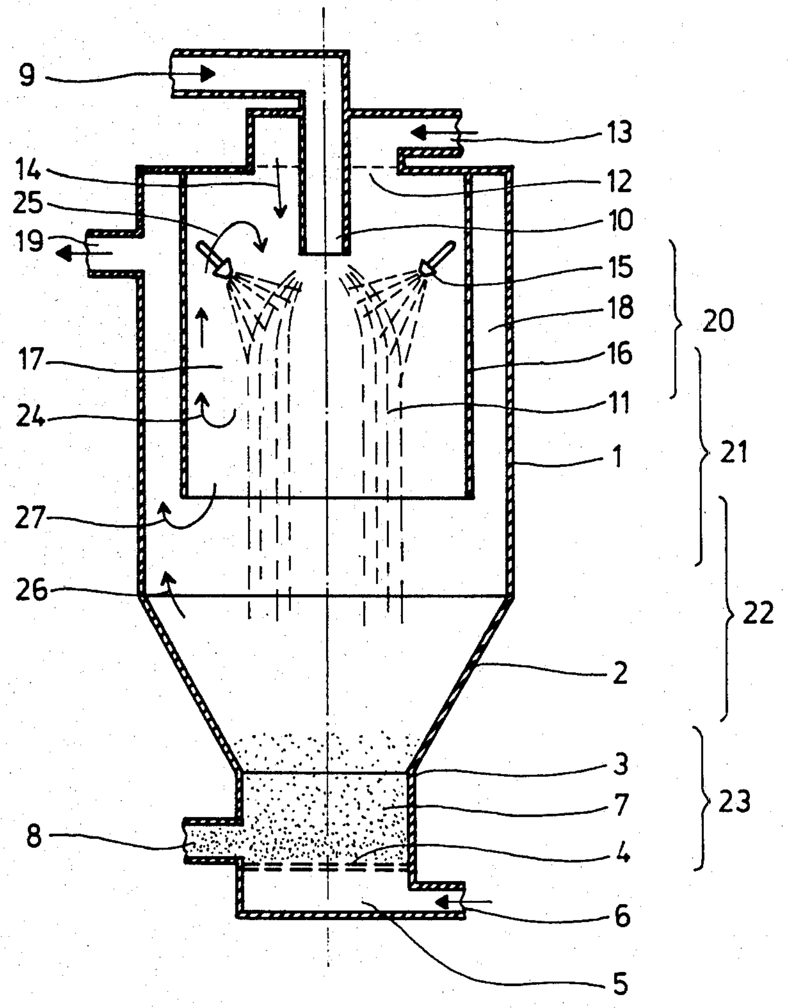
9
13
14
12
25
10
19
15
18
20
17
16
24
11
21
1
27
26
22
2
3
23
7
8
4
6
5

METHOD FOR TREATING PARTICULATE MATERIAL

BACKGROUND AND SUMMARY OF THE INVENTION

The invention relates to a method involving the introduction of to-be-treated particulate material into a treatment chamber together with relatively hot gaseous material. The said constituents are charged into a chamber at the top and into a spray means. While dropping freely the sprayed particulate material is passed through a series of zones, one of which is a transition zone. The treated particulate material is collected by the fluidized bed provided in the lower part of the chamber. The fluidized bed is also actuated by a hot gas. Since not only the gaseous medium of the fluidized bed but also the gas entering with the material at the upper part of the spray mixer is hot, the drying of the moistening liquid begins in the upper part of the spray and mixer chamber immediately at and after the moistening of the material. The gas introduced into the spray mixer chamber from above absorbs in the spray and transition zone liquid, whereby the partial pressure of the liquid vapor in the gas is increased. Due to the fact, however, that the gas is introduced at high temperature, this partial pressure is not so high that the drying speed during the period of transition would thereby be substantially affected.

On the other hand, the invention is also based on the fact that it is advantageous to reduce the drying speed in the period of transition considerably or even to eliminate the drying in such zone, so that the liquid can penetrate the pores or interstices of the moistened material so much better and soaks the latter more uniformly, or that the liquid present on the surface of the material for a longer time facilitates the agglomeration process. In order to achieve this, the teaching of the invention consists in that the material, after the moistening with the liquid, is left during the period of transition in an atmosphere of high partial pressure of the liquid vapor. In practice this is accomplished by introducing, at the head of the spray mixer, gas of a low temperature and/or gas with high partial pressure of the moistening liquid vapor, and/or by enriching the gas in the spray area or in front thereof with vaporized moistening liquid in order to increase the partial pressure thereof.

A high partial pressure means a pressure close to the saturation pressure of the vaporized liquid. The invention can therefore also be expressed in such a manner that in the treatment zone the gas should have a relative humidity of close to 100%, with relation to the moistening liquid.

Suitably such an atmosphere with a relative humidity of close to 100% is present not only in the transition zone adjacent to the moistening zone, but in the moistening zone itself, so that the period during which the moistening liquid remains unevaporated is as long as possible, or so that the height of the spray mixer chamber can be correspondingly diminished by the shortening of the transition zone adjacent to the moistening zone.

In order to avoid a chilling of the material by a sudden transition from the saturated atmosphere of the transition zone into the drying zone of the fluidized bed, it may be practical to include an intermediate zone wherein the partial pressure of the moistening liquid vapor decreases gradually.

DESCRIPTION OF THE DRAWING

The single drawing provided is a diagrammatic cross-sectional view of the device for carrying out the precepts of the invention.

DETAILED DESCRIPTION OF THE INVENTION

The method is described in greater detail below taken together with the drawing of the device used to carry out the said method. The device is a cross-sectional view of the device illustrated in a diagrammatic method but with sufficient particularity so the invention may be readily understood.

The device is a generally, cylindrical mixing device having spraying means as will be depicted hereinafter. The mixer chamber or device is a hollow container 1 having a vertically disposed axis which gradually diminishes in diameter progressively downwardly to produce a funnel-like arrangement 2. The funnel-like arrangement 2 terminates in a narrowed cylindrical base section 3. The said base section terminates with a horizontally disposed perforated bottom wall 4. The said bottom wall 4 has a lower space 5 thereunder, further defined by the said narrowed cylindrical base section 3. The said space 5 is adapted and constructed to communicate with an input conduit means 6 adapted and constructed to admit a gaseous medium in a manner to achieve a vortex. The gaseous medium so admitted is permitted to move through the perforation of the wall 4 whereby to entrain the particulate material to form a fluidized bed 7 seen to accumulate in the confines of said narrowed cylindrical base section 3. The said narrowed cylindrical base section 3 is supplied with a take-off conduit 8 which is proximate the said perforated wall 4.

At the top portion of the device 1, the top is provided with an ingress centrally and axially disposed conduit 9 through which the particulate material may be readily dispensed into the device. It will be seen that the introduction is achieved into a closed head of the device. Furthermore, it will be seen that conduit 9 terminates in the container at a point somewhat below the top thereof. In fact it terminates at 10 whereby the particulate material is readily distributed to produce a sort of a mist 11 of the particulate material as exemplified in the drawing. The mist producing means 10 is surrounded by an annularly disposed annular perforated metal wall 12 through which a gas is fed from ingress conduit 13 passing externally of the device and the gas moves in a direction as defined by the arrow 14.

A plurality of nozzles 15 are provided in an annular configuration about mist producing means 10 directly therebelow. The said spray nozzles 15 are positioned to spray a liquid upon the finely divided particulate material defined as the mist. The spray and the particulate material in mist form are seen to be located in a zone 17 as defined by the top of the aforementioned container 1 and a cylindrical wall 16 which extends downwardly to a level above the funnel-like arrangement 2, mentioned in the above. An annular space 18 is defined between the said cylindrical wall and the outer cylindrical wall of the container 1. The upper portion of said space along the said wall of the container is provided with an exhaust conduit 19 through which gaseous products are discharged as a result of charging into the container by means of conduits 6 and/or 13 as mentioned in the above.

Different treatment zones are provided within the confines of the container. For instance, the spray application or moisturizing zone is approximately depicted by the bracket and reference numeral 20. Downwardly therefrom but in somewhat overlying portion is the second zone 21 which may be termed a transition or rest zone. This zone 21 gradually evolves into an intermediate zone 22 which in turn merges into the final zone 23 encompassing the fluidized bed 7 mentioned in the foregoing.

It will be appreciated that zones 20, 21 and 22 do not possess well defined sharp boundaries. Nor is this necessary, as according to the inventive principles embodied herein, it is important that adjacent to spray zone 20, i.e. zone 21, as well as in the spray zone 20, the zones comprise zones of high relative moisture. In these zones, then, the to-be-removed drying liquid which is applied in the spray zone 20 to the particulate material is in fact not yet removed. If in fact there is a modicum of removal as by evaporation, such is so slight, that penetration of the liquid into the interstices of the particulate material is accomplished whereby the desired agglomeration of adjacent particles can take place in a more suitable manner than if the to-be evaporated liquid would start to immediately evaporate after the moistening step.

For a better understanding, the apparatus of the present invention is operated in the following manner. The gas introducted into the container at 13 is adjusted to a temperature and relative humidity that the heat and particulate material is in relative equilibrium in zone 21. In zone 20 the relative humidity is essentially saturated. This establishment of the desirable but necessary parameters is achieved by control of a number of the through-put ingredients—namely, volume of particulate material, volume of sprayed liquid and volume of introduced gases plus the temperature levels are also adjusted. As an example of controlled operation, the volume of the gas introduced at 13 can be diminished in such a manner that even the liquid supplied to the gas by the spray means or the moistened particulate material temporarily residing in the spray zone may suffice for the saturation of the particulate material.

The reduction of the amount of gas introduced by means of conduit 13 may be nil in some instances. In such a case, circulation of the particulate material results in the general volume or space 17 under the aegis of the introduced particulate material 11 itself, which circulation is indicted by arrows 24, 25 and through which steadily humidified gas passes from the zone of particulate movement into the spray zone. This beneficial circulation occurs through perforated wall 12 as a quantity of gas is introduced and is mixed with the fed gas. The gas introduced by means of conduit 13 may initially contain relatively high moisture content as it may be recirculated from outlet conduit 19. In the event the gas being discharged by conduit 19 is too dry, it can be cooled, whereby, with its absolute moisture content unchanged, the relative humidity will increase.

Of course, the temperature of the particulate material being fed by conduit 19 and distributed by means 10 has bearing on the accomplishing of the purposes intended. When the particulate material is cool in relation to the gas introduced at conduit 13, the gas thereby introduced will be cooled in a heat exchange relationship with the material and thereby its relative humidity will rise.

The liquid sprayed through the nozzles 15 may be increased to a higher temperature, so as to cause evaporation more quickly in the spray application zone and to increase the relative humidity of the gas. Faster evaporization thereby affected is not deemed contrary to the precepts of the invention. According to such concepts, it matters only that the liquid remain as long as possible unevaporated on the particulate material, while a possible evaporation by the nozzle sprays or the humidification by the nozzle sprays play only a small part. By small part is nevertheless meant that the liquid is injected in sufficient quantity or is in such dilution that there remains even after the liquid vaporization in the immediate spray zone a quantity which is sufficient in all respects, such as viscosity, whereby the particulate material is sufficiently humidified during the passage of the particulate material during the transition zone.

It is also feasible to increase, by special gas humidification means within the container, the relative moisture of the gas in the spray zone or in front of the spray zone, namely, e.g. by the introduction of vapor of the moistening liquid.

In zone 22 moist gas from volume or space 17, as well as dry gas or relatively less moist gas from zone 23 are present. In this intermediate zone, therefore, the relative moisture increases gradually from the lower edge of cylindrical wall 16 to the fluidized bed 7. The dry atmospheric gas introduced at input conduit 6 affects the particulate material gradually as opposed to high impact impingement. The excess gas from volume or space 17 and from zone 22 is charged into annular space 18, after passing through zone 22. The gases exit out of outlet conduit 19 in the direction of arrows 26 and 27.

The dried particulate material is withdrawn from the fluidized bed 7 through egress conduit 8 as can be seen from the drawing.

What is claimed is:

1. The method for moistening and subsequently drying particulate material comprising introducing gas entrained particulate material into a first zone, treating said gas entrained particulate material in said first zone with a spray of moisturizing liquid (while said particulate material is gas entrained), providing a free falling zone below said first zone through which said wetted particulate material is permitted to fall whereby penetration of the liquid into the interstices of the particulate material is accomplished, thereafter accumulating said treated particulate material in a fluidized bed zone positioned below said free falling zone, said particulate material being further treated by relatively high gas flow at the fluidized bed zone whereby said accumulated particulate material is removed from the locus of said fluidized bed zone, said gaseous flow being adjusted whereby the gases have a relatively high partial pressure of the moisturizing liquid in the free falling zone and a lower partial pressure in the fluidized bed zone.

2. The method of claim 1 wherein gas is introduced proximate the said first zone.

3. The method of claim 1 wherein gas is removed from the locus of free falling zone.

4. The method of claim 3 wherein gas is introduced proximate the said first zone.

5. The method of claim 4 wherein the high gas flow introduced into the said fluidized bed is a vortex flow.

* * * * *